United States Patent Office 3,085,689
Patented Apr. 16, 1963

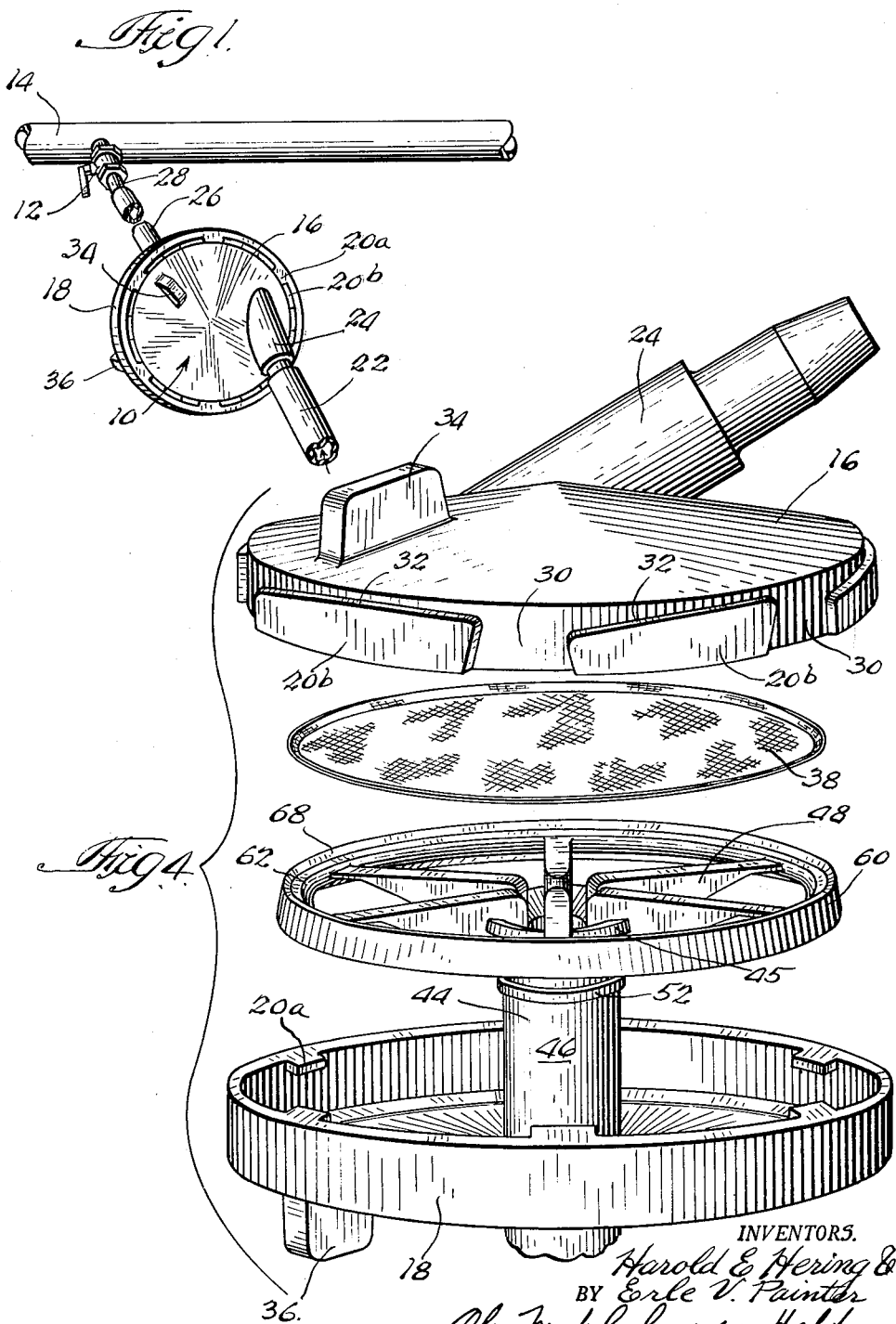

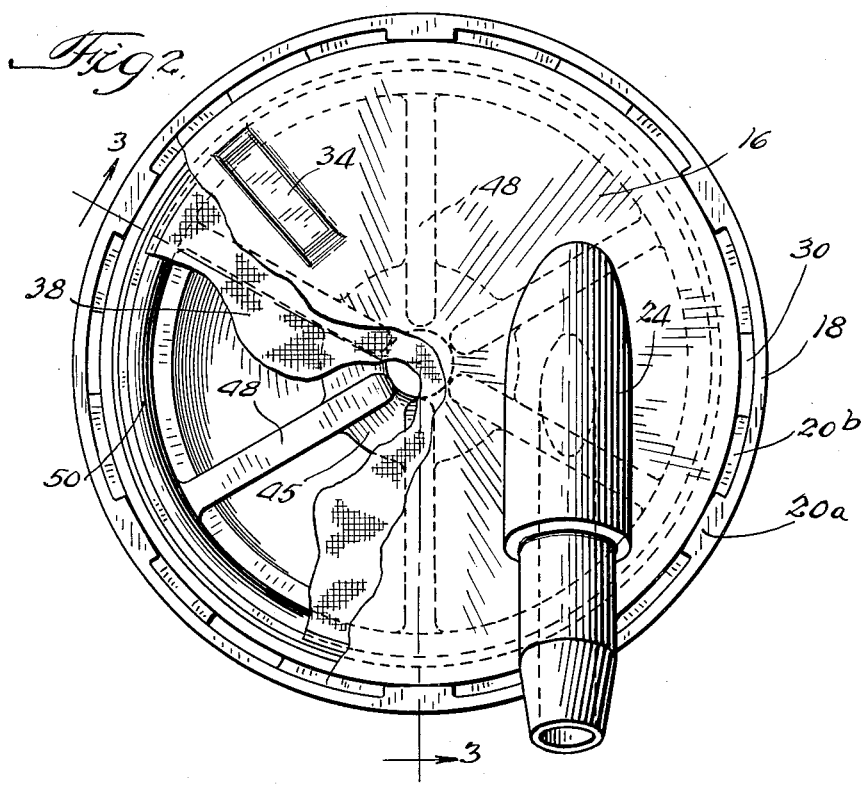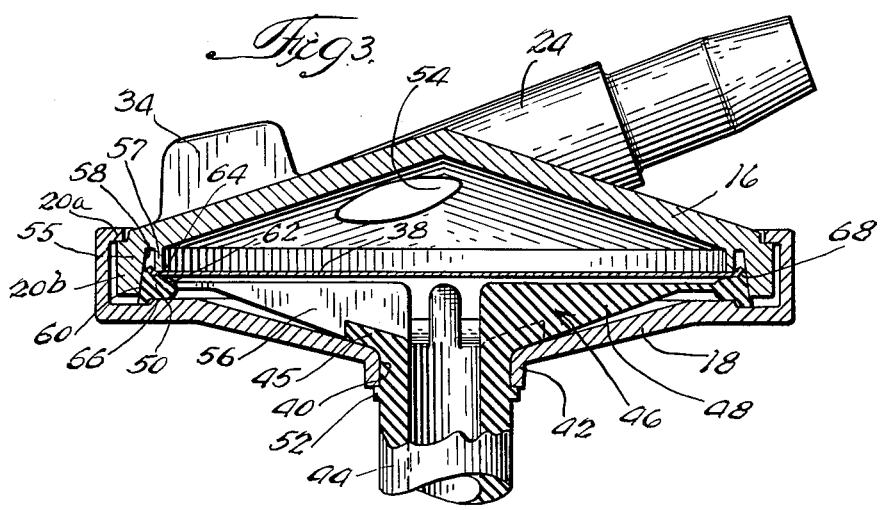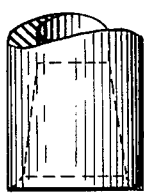

3,085,689
FILTER ASSEMBLY
Harold E. Hering, Cicero, and Erle V. Painter, La Grange, Ill., assignors to Johnson & Johnson, New Brunswick, N.J., a corporation of New Jersey
Filed Feb. 9, 1960, Ser. No. 7,708
9 Claims. (Cl. 210—232)

This invention relates to an improved filter assembly and, more particularly, in one embodiment relates to an improved filter assembly for use in a milk line for filtering any impurities from the milk before the milk is deposited into a bulk tank.

In modern dairy operations automatic milking equipment is employed in a highly mechanized system for milking hundreds of cows in a very short time. In such an operation it is often possible to have a single diseased or unhealthy cow in a large herd and unless some specific means is provided for checking the milk of each cow, the presence of this condition might go undetected for a substantial period of time. Of equal importance is the fact that the milk from many cows may be criticized or even condemned when a bulk supply shows some contamination when, in fact, the foreign matter or contamination is the result of a single animal.

The apparent foreign material in the milk may be the result of an animal which is poorly cleaned prior to milking, introducing external dirt and sediment into the milk supply. The apparent foreign matter may also result from an unhealthy condition of an animal wherein solid particles, sediment and foreign matter is internally generated by the cow and entrained in the milk.

By detecting with accuracy the exact source of the contamination, sediment, or foreign matter it is usually possible not only to insure a constantly clean and safe milk supply but also to detect immediately a troublesome animal, determine the source of the trouble and either insure proper cleaning in the future or cure the particular animal of its affliction, if any. Thus, filtering of the milk coming from each individual cow before it enters a central pipe line system is essential to a safe milk supply, as well as the prompt diagnosis of any possible disease or lack of sanitation.

It has been the experience of sanitarians, herdsmen, milkers and the like that a filter, to be effective, must be subject to quick changes during the normal milking operation, must be subject to visual observation during milking, and must be reasonable in cost. Heretofore no filter or filter assembly available to the dairy industry has satisfied these requirements.

It is therefore one important object of this invention to provide an improved filter assembly capable of quick interchange of the filter medium.

It is another object of this invention to provide an improved filter assembly in which the condition and degree of contamination of the filter medium can be continuously and visually monitored.

It is still another object of this invention to provide an improved filter assembly which is relatively inexpensive and yet operates efficiently for relatively long periods of time without premature clogging of a limited area of the filter medium.

Another object of this invention is the provision of an improved vacuum-tight filter assembly for use in fluid systems wherein the filter assembly forms seals to prevent possible bypass of the filter medium or loss of vacuum.

It is another object of the invention to provide an improved filter assembly which is safe and sanitary, and not subject to probable contamination in handling.

It is one further object of the invention to provide a filter assembly having no loose or free parts which might fall to the floor and become contaminated or lost.

Further and additional objects of this invention will become manifest from a consideration of this description, the accompanying drawings and the appended claims.

In one form of the invention a two-part holder is provided in which the parts are detachably connected to define a central cavity. A combined outlet tube, filter supporting spider, and annular gasket is secured in the outlet housing to form seals respectively with the inlet and outlet housing and to clamp a disk-like filter medium in place. The inlet housing is provided with an inlet passageway disposed radially outward from the center of the filter medium and adapted to inject milk or other liquids to be filtered onto the filter medium at a substantial angle to produce a circular swirling movement over the filter medium.

The entire housing is made of transparent material so that the medium may be continuously inspected.

For a more complete understanding of this invention reference will now be made to the accompanying drawings wherein:

FIG. 1 is a diagrammatic view of one filter assembly constructed in accordance with this invention and incorporated into a milking pipe line.

FIG. 2 is a plan view of the filter assembly with portions broken away.

FIG. 3 is a transverse sectional view of the embodiment of the invention shown in FIG. 2 and taken on the line 3—3 thereof; and FIG. 4 is an exploded perspective view of the embodiment of FIG. 2.

Referring now to the drawings and more particularly to FIG. 1 a filter assembly 10 is shown connected through a control valve 12 to a conventional pipe line 14 in a centralized bulk tank milking system. While the disclosed embodiment will be described herein as it specifically relates to the problem of milk filtration in vacuum operated pipe line systems, it will be immediately apparent that the novel features of the invention are of substantially equal value irrespective of the fluid to be filtered or the system employed.

The filter assembly 10 is composed of an inlet housing 16 and an outlet housing 18 which are connected together by a quickly detachable peripheral connecting means 20 consisting generally of lugs 20a on the outlet housing and cooperating cam lugs 20b on the inlet housing. A rubber hose 22, forming a part of a conventional milking machine (not shown), is connected to the inlet port 24 of the inlet housing 16. The rubber hose 22 will in the typical embodiment be connected directly to the milking machine disposed immediately adjacent to the cow which is being milked. An outlet tube 26 is an integral part of the instant embodiment and is connected directly to a rigid conduit 28 which is in turn connected to a valve 12. The rigid conduit 28, valve 12 and pipe line 14 form integral parts of the permanent bulk installation. The outlet tube 26 may be quickly attached and removed therefrom during the milking operation.

In one conventional system the main pipe 14 is partially evacuated and connected to a bulk tank into which the milk is dumped. When a particular milking position is idle the valve 12 is closed and when that position is active the rubber tube 26 is connected to the conduit 28 and the valve 12 is opened. Under those conditions milk passes through inlet hose 22 and inlet port 24 onto the filter medium contained within housing 10 and then through outlet tube 26 and into main pipe 14.

As more clearly shown in FIGS. 2, 3 and 4, the outlet housing 18 is provided with six small lugs 20a which extend radially inward from the outer housing wall.

These lugs are aligned with channels 30 formed in the inlet housing 16 whereby the inlet and outlet housings intermesh. By telescoping the two housings and turning the housings relative to one another the cam-like surfaces 32 on cam lugs 20b interlock with the small lugs 28 and draw the housings together in locked engagement. Finger grips 34 and 36 are provided on the inlet and outlet housings respectively to facilitate assembling the housing and producing the relative twisting motion between the housing parts for locking and unlocking the assembly.

It is desirable that both the inlet housing 16 and the outlet housing 18 be formed of transparent materials such as molded plastics in the nature of methyl methacrylate and polystyrene. To obtain the advantages of the instant invention it is quite important that at least the inlet housing 16 be of transparent material so that the inlet side of the filter medium 38 may be readily observed for testing and evaluation purposes and for immediate detection of contamination.

As best shown in FIG. 3 the inlet housing 16 and outlet housing 18 are of cup-shape. The outlet housing 18 has a central aperture 40 with an outwardly extending flange 42 thereabout. The aperture 40 is designed and proportioned to receive the tubular portion 44 of the spider assembly 46. The spider assembly 46 includes a tubular portion 44, an annular flange 45 for forming a seal with the outlet housing, a plurality of ribs 48 extending outwardly from the tubular portion, and an annular sealing ring 50. The spider is preferably integrally molded of a flexible material, such as rubber, neoprene, or any other material forming a satisfactory gasket. When the tubular portion 44 is inserted through aperture 40 in outlet housing 18 and is forced into a seated position a small shoulder 52 formed on tube 44 locks the spider in position and prevents inadvertent and accidental removal thereof. Thus the annular sealing ring, ribs and flexible tube become an integral part of the outlet housing 18 whereby no part can be inadvertently dropped, lost or contaminated while the filter assembly of the instant invention is in use.

In FIG. 3 the filter medium 38 is shown in position within the housing. The filter medium may be any desired material depending upon the fluid to be filtered and the degree of selection of contaminating particles which is desired. In some instances fine mesh screens might be employed. In the filtration of milk a filter medium composed of nonwoven fibers pressed into sheet form is extensively used and is so well known as to require no further description. The filter material is cut into a disk which is substantially flat and subdivides the cavity within the filter housing into an inlet chamber 54 and an outlet chamber 56.

As milk enters the housing 10 through inlet port 24 it enters the inlet chamber 54 where it swirls about under its own inertia and passes through the filter medium 38 into the outlet chamber 56 and then through the outlet tube 44. The outlet tube 44 is connected to the evacuating system which produces the pressure for continuous flow. As sediment or the products of mastitis which may be present in the milk are retained by the filter medium 38 they are generally urged outwardly by the flow of milk to produce a generally uniform deposit on the filter medium with a slight concentration at the outer periphery.

The filter medium 38 is urged toward the outlet chamber 56 by the pressure within the system. However, the filter medium is supported in position on the ribs 48 whereby rupture thereof is prevented. An important feature of the instant invention is the integral formation of an annular sealing gasket 50 with the ribs 48 whereby heretofore loose pieces which might fall to the floor and become contaminated are securely incorporated in the assembly. The shapes of the peripheral portions of the inlet housing 16, outlet housing 18 and spider 46 are also unique and cooperate in a unique manner. As shown best in FIG. 3 the inlet housing 16 has a main skirt 55 which supports locking cam lugs 20b. Inwardly of skirt 55 is a clamping ring 57 spaced from skirt 55 and extending generally parallel thereto.

The inner surface 58 of skirt 55 is frusto-conical for the purpose to be described. The annular gasket 50 has a frusto-conical outer periphery 60 which conforms generally to the inner surface 58 of skirt 55 and is substantially of the same diameter. Thus, when the two housing portions are assembled together gasket 50 is compressed therebetween and the outer conic surface 60 forms a seal with the corresponding conic surface 58 in the input housing 16. This seal is sufficient to withstand a substantial vacuum within the input chamber 54 and the sealing force is actually augmented by the vacuum.

The clamping ring 57 engages an inner shelf 62 of annular gasket 50 and clamps the periphery 64 of the filter medium 38 therebetween. As the filter medium 38 is porous and of limited compressibility the clamping of the periphery 64 between the gasket shelf 62 and clamping ring 57 will not form a vacuum-tight seal but merely a clamp and a seal sufficient to prevent any bypassing of unfiltered fluid. The pressure of clamping ring 57 on gasket 50 through filter medium 38 is transmitted against a shoulder 66 of the output housing 18.

A vacuum-tight seal is thus formed which is sufficient to prevent leakage in the system and to avoid any loss of vacuum. Thus in assembling the instant unit relative rotation of the input and output housings produces a clamping action between ring 57 and shoulder 66 which clamps the filter medium 38 in place and at the same time forms a vacuum-tight seal between annular gasket 50 and the output housing 18. At the same time the conic surface 60 of the gasket 50 is urged into engagement with the conic surface 58 of housing 16 to form a vacuum-tight seal for the input chamber 54.

The annular gasket 50 is formed with a small lip 68 at the periphery thereof which defines a central shelf 62 on which the filter medium 38 rests and which serves to quickly and accurately center the filter medium. Thus in practice an extremely simple, easy to use filter assembly is provided which enables an operator to quickly and continuously monitor the degree of contamination and condition of the filter. Moreover, by this invention a filter holder is provided which enables a milker or farmer to quickly and easily change the filter during actual milking operations in the event that the filter becomes clogged. There are no free parts which might fall to the floor of the milking area. The interchange of filter media can be accomplished with only a very brief interruption of the milking operation and without any substantial loss of the milker's time. Through the use of the instant invention filter media are changed more frequently providing safer and cleaner milk and a continuous and accurate check on the condition and health of each cow in a given herd. Thus, through this invention continuous testing and observation of individual cows with concomitant improved milking conditions is accomplished.

While one particular embodiment of this invention is described herein in detail it will become immediately obvious that one may obtain certain of the advantages and employ certain of the unique structural characteristics while omitting others. Thus, one may employ the combined spider and gasket of the instant invention while omitting certain of the other unique features or one may change the precise size or shape of the spider, the annular gasket, the housing or the locking means while still incorporating the important features of the instant invention. Also, in the described embodiment it has been found desirable to position the axis of the inlet port 24 approximately midway, radially, between the central axis of the filter assembly and the periphery thereof and at about 30° to the plane of the filter medium. Other orientations may prove more advantageous under certain conditions or with fluids other than milk. A quickly detachable interconnection between the inlet housing and outlet housing having interlocking lugs in the nature of a bayonet socket is employed in the disclosed embodiment. However, other quickly detachable connecting means may be employed including threaded connections with a relatively rapid thread or auxiliary quick-acting clamps. However, it is greatly preferred that the interconnecting means requires no tools for operation and includes no separable parts which might be dropped or lost.

Without further elaboration, the foregoing will so fully explain the character of our invention that others may, by applying current knowledge, readily adapt the same for use under varying conditions of service, while retaining certain features which may properly be said to constitute the essential items of novelty involved, which items are intended to be defined and secured to us by the following claims.

We claim:

1. A filter assembly comprising a relatively rigid inlet housing having an inlet opening, a relatively rigid outlet housing having an outlet opening, quickly detachable interlocking means interconnecting said inlet housing and said outlet housing to define a closed cavity therebetween, a generally flat filter medium dividing said cavity into an inlet chamber and an outlet chamber, and an annular resilient sealing gasket having means defining an annular shelf for centering and supporting said filter medium, said gasket being compressed between said inlet housing and said outlet housing to clamp said filter medium between said sealing gasket and one of the housings and to form a seal with the other of said housings to seal the corresponding chamber, said sealing gasket having a generally conic outwardly extending means directly engaging said one of the housings adjacent said filter medium to exert radial pressure thereon and to form a seal with said one of the housings.

2. An integrally molded spider for use in a filter assembly or the like comprising a tubular conduit, a plurality of independent ribs extending radially outward from said conduit with open spaces therebetween and defining a filter supporting surface, and an annular sealing gasket connecting the outer ends of said ribs, said ribs being interconnected only at their respective ends through said conduit and said gasket, said annular gasket defining an annular shelf in general alignment with said filter supporting surface to define a filter aligning guide, said spider being formed of a resilient material suitable for use as a sealing gasket.

3. An integrally molded spider for use in a filter assembly or the like comprising a tubular conduit, a plurality of independent ribs extending radially outward from said conduit with open spaces therebetween and defining a filter supporting surface, and an annular sealing gasket connecting the outer ends of said ribs, said ribs being interconnected only at their respective ends through said conduit and said gasket, said annular gasket defining an annular shelf in general alignment with said filter supporting surface to define a filter aligning guide, said annular gasket having a frusto-conical periphery to define a sealing surface, said spider being formed of a resilient material suitable for use as a sealing gasket.

4. A filter assembly comprising a relatively rigid inlet housing having an inlet opening; a relatively rigid outlet housing having an outlet opening; quickly detachable locking means interconnecting said inlet housing and said outlet housing to define a closed cavity therebetween; a generally flat filter medium dividing said cavity into an inlet chamber and an outlet chamber; and a spider member formed of a resilient material, said spider including a plurality of ribs secured in said outlet housing and defining radial fluid paths therebetween and an integrally formed annular sealing gasket interconnecting the outer ends of said ribs and surrounding said ribs, said ribs and gasket supporting said filter medium, said sealing gasket being compressed between said inlet housing and said outlet housing to clamp said filter medium between said sealing gasket and said inlet housing and adjacent said ribs, said gasket forming a fluid tight seal with a portion of said outlet housing and sealing said outlet chamber, said sealing gasket having a peripheral portion directly engaging the inlet housing adjacent said filter medium to form a fluid tight seal with a portion of said inlet housing.

5. The filter assembly of claim 4 wherein means defining an annular shelf is formed in said gasket inwardly of the periphery and on the inlet side thereof, said annular shelf centering said filter medium in said filter assembly and insuring proper clamping and sealing with said inlet housing and said outlet housing.

6. The filter assembly of claim 4 wherein said spider member has an axially extending tube interconnecting said ribs at the inner ends thereof and extending outwardly through said outlet opening, said tube having a retainer thereon which engages said outlet housing adjacent said opening to retain said spider member in said outlet housing.

7. The filter assembly of claim 6 wherein said inlet housing has an inlet tube secured thereto and surrounding said inlet opening, said inlet tube having its axis disposed at an acute angle to the surface of said filter medium and outwardly from the central axis thereof whereby a circular motion is imparted to fluids flowing therethrough for maximum filter efficiency and residue distribution.

8. The filter assembly of claim 7 wherein said inlet housing is formed of a transparent material whereby said distributed residue is subject to efficient inspection.

9. A filter assembly comprising a relatively rigid inlet housing having an inlet opening, a relatively rigid outlet housing having an outlet opening, quickly detachable interlocking cam means interconnecting said inlet housing and said outlet housing to define a closed cavity therebetween, a generally flat filter medium dividing said cavity into an inlet chamber and an outlet chamber, and an annular resilient sealing gasket for supporting said filter medium, said gasket being compressed between said inlet housing and said outlet housing when said cam means are interlocked to clamp said filter medium between said sealing gasket and one of the housings and to form a seal with an annular portion of the other of said housings to seal the corresponding chamber, said sealing gasket having a generally conic outwardly extending means directly engaging an annular portion of said one of the housings outwardly of said filter medium to exert radial pressure thereon and to form a seal with said one of the housings.

References Cited in the file of this patent

UNITED STATES PATENTS

| | | |
|---|---|---|
| 2,714,455 | Galloway | Aug. 2, 1955 |
| 2,808,937 | O'Meara | Oct. 8, 1957 |
| 2,818,178 | Hodsdon | Dec. 31, 1957 |
| 2,879,207 | Poitras | Mar. 24, 1959 |

FOREIGN PATENTS

| | | |
|---|---|---|
| 18,941 | Great Britain | Oct. 22, 1892 |